US006048285A

United States Patent [19]

Chou

[11] Patent Number: 6,048,285

[45] Date of Patent: Apr. 11, 2000

[54] BEARING STRUCTURE FOR VERTICAL BLINDS AND ROLLERS SHADES

[76] Inventor: Tser-Wen Chou, 19464 Via Del Caballo, Yorba Linda, Calif. 92686

[21] Appl. No.: 09/096,207

[22] Filed: Jun. 11, 1998

Related U.S. Application Data

[62] Division of application No. 08/917,584, Oct. 23, 1997, Pat. No. 5,875,829.

[51] Int. Cl.[7] ............................ F16H 7/20; A47G 5/02; F16C 19/04

[52] U.S. Cl. ............................ 474/199; 160/168.1 V; 160/321; 160/319; 384/490

[58] Field of Search ............................ 160/319, 321, 160/323.1, 168.1 V, 173 V, 176.1 V, 177 V; 384/571, 490; 474/199

[56] References Cited

U.S. PATENT DOCUMENTS

| | | | |
|---|---|---|---|
| 4,223,714 | 9/1980 | Weinreich et al. | 160/319 X |
| 4,291,593 | 9/1981 | Santambrogio . | |
| 4,557,159 | 12/1985 | Gross | 160/168.1 V X |
| 4,834,164 | 5/1989 | Tuhey, Jr. | 160/319 |
| 4,844,139 | 7/1989 | John | 160/168.1 V |
| 5,173,073 | 12/1992 | Huang . | |
| 5,251,987 | 10/1993 | Supanz | 384/571 |
| 5,297,608 | 3/1994 | Rap et al. | 160/177 R |
| 5,488,983 | 2/1996 | Jung . | |

*Primary Examiner*—Mary Ann Battista
*Assistant Examiner*—Marcus Charles
*Attorney, Agent, or Firm*—Curtis L. Harrington

[57] ABSTRACT

An improved bearing mechanism works in conjunction with the control rod of a vertical blind system or a roller shade system to provide superior bearing and load handling capability. A conical bore has a plurality of grooves into the surface of the conical bore. A series of cylindrical rollers are supported within the grooves, and against a central rotational member having a conical surface for bearing against the rollers. A set screw is used to control the seating of the central rotational member within the conical bore, is used to make up any tolerance created through the manufacturing process, and can be used to increase the tension necessary to hold a roller shade in place.

9 Claims, 9 Drawing Sheets

BEARING STRUCTURE FOR VERTICAL BLINDS AND ROLLERS SHADES

This is a division, of U.S. patent application Ser. No. 08/917,584 filed Oct. 23, 1997 now U.S. Pat. No. 5,875,829.

FIELD OF THE INVENTION

The present invention relates to the field of window coverings and more particularly for improvements in bearing structures for adequately supporting and enabling the rotational movement of load bearing structures used to actuate vertical blinds and roller shades and which may be used to actuate any horizontal or other rotatable member.

BACKGROUND OF THE INVENTION

Conventional support and track systems for vertical blinds and roller shades have concentrated on two problems with two different structures.

First, for vertical blinds, the main objective has been to eliminate friction in actuating the rotation of the control rod which extends along the drapery track and which turns the individual vertical blind units simultaneously to admit or shut off light from entering the room. The control rod engages a gear associated with each support structure for each vertical blind panel, known as a carrier. The carrier has the ability to freely translate and roll within a raceway within the track, the system then having an ability to rotate the control rod to change the angle of the vertical blind panels regardless of where the carriers are located along the track.

Thus, the rod's contact with several carriers adds significant mechanical resistance to turning, especially when the turning is accomplished from the end of the vertical blind track. A significant turning force complicates the actuation with a pull chain, as the pull chain sprocket will normally experience additional friction from being actuated by being pulled downward, at a right angle from its axis of rotation.

One method and technique which has been applied to this problem is the use of the concentric reducing gear. This normally cuts the pull chain force in half by doubling the length of travel of the pull chain, but because of the lateral force friction, probably reduces the force by about ⅓. This can make the operation of the vertical blind set fussy and time consuming. Moreover, the gear mechanism significantly increases the cost of the mechanism, both from a number of parts standpoint, assembly standpoint, and even more importantly from a tolerance standpoint.

The cost for injection molded parts increases significantly once the tolerance specifications are made more exacting. Where several parts have to fit together and work properly, the tolerances have to be controlled within strict limits. Stricter limits translate to longer cycle times in the injection mold process and greater waste, both of which drive up the cost.

The size factor multiplies and exacerbates the above factors. Keeping tolerance on a small part is difficult. Having a series of smaller parts perform a load bearing function doesn't leave much room for wear. The use of a metal ball bearing set is out of the question as the added cost would be unbearable by the market.

Roller shades present the problem of controlled friction, coupled with bearing lateral force resistance and wear. One popular design uses a two ended coil spring which is activated by pushing the spring in an unwind direction to cause it to lose its grip and move. The spring, however, produces a good deal of friction upon the cylindrical tube upon which it is mounted. So, where the spring is made strong enough to strongly resist pulling on the window shade, it adds significant friction to the tube upon which it is mounted. Since the ends of the springs are all that hold the window shade in place, making a smaller spring would cause the force from the shade to bend the spring ends. As a result, the window covering industry has had to settle for a device which produces significant resistance to operation in order to provide window roller shade control. In reality, the force moment on a roller shade is small due to a general balance of material when rolled up, and a relatively short turning moment when fully unrolled.

In both the window shade and vertical blind configurations, the necessity to place greater force on the actuating member, particularly in the downward direction, means that greater time and effort must be expended in making certain that the mounting of the track or bracket is sufficient to withstand the pulling force of the actuation member, usually a looping suspended chain. So even in instances where dry wall would be sufficient to hold the roller shade or vertical blinds and more, additional labor and structure will be needed to further anchor the window covering device to a stud or beam. Of course, all installations should be secure, but where additional anchoring is needed simply because of the unreasonable forces needed to operate the window covering mechanism, the added money for much higher installation costs are not justified.

What is therefore needed is a mechanism for a window covering device which can be inexpensively injection molded and which makes up for relaxed tolerance in manufacture. The device should have load bearing capability and for roller shades, the resistive force to prevent the unwinding of the window shade should be adjustable.

SUMMARY OF THE INVENTION

An improved bearing mechanism works in conjunction with the control rod of a vertical blind system or a roller shade system to provide superior bearing and load handling capability. A conical bore has a plurality of grooves into the surface of the conical bore. A series of cylindrical rollers may be supported within the grooves, and against a central rotational member having a conical surface for bearing against the rollers. A set screw is used to control the seating of the central rotational member within the conical bore, is used to make up any tolerance created through the manufacturing process, and can be used to increase the tension necessary to hold a roller shade in place.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
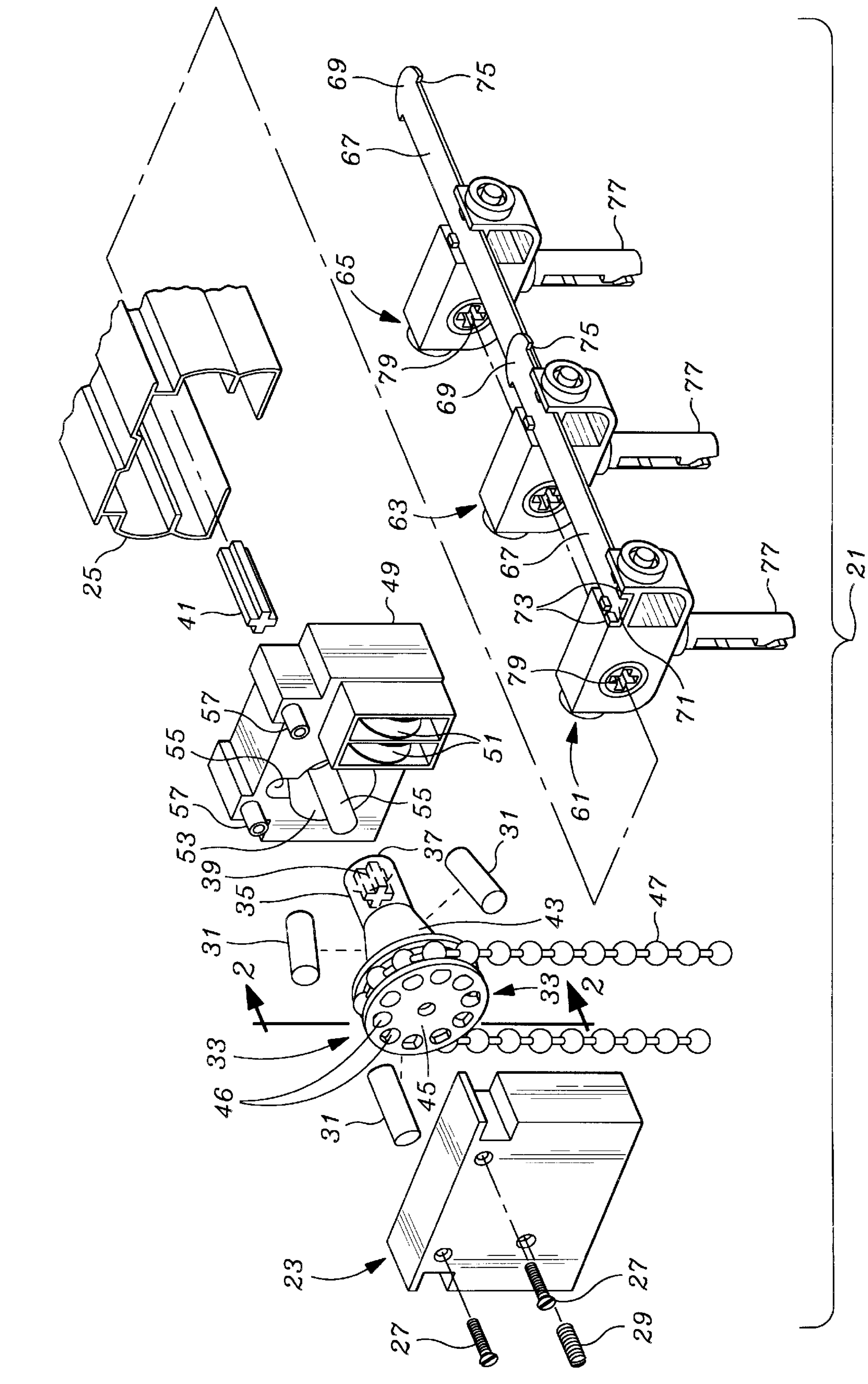
FIG. 1 is a perspective partially exploded view of the system used with a vertical blind configuration and in which the end unit is open illustrating the main rotational member.

The description and operation of the invention will be best initiated with reference to a vertical blind configuration which shown in FIG. 1. FIG. 1 is perspective partially exploded, distributed view illustrating a vertical blind system 21 made up of structures which are shown outside of their supporting rail or track which provides vertical support and enables horizontal translation of the vertical blind panels (also not shown) which are typically drawn to cover a window or sliding door. Beginning at the left, an outer housing member 23 has an outer shape which matches the outer shape of track 25. a series of two upper screws 27 are used for attachment of the outer housing member 23, while a set screw 29 is threadably supported by the outer housing member 23 and is used for adjustment by being urged into the outer housing member 23, as will be shown.

To the right of the outer housing member 23, a series of three solid cylindrical roller bearings 31 are shown surrounding a central bearing member 33. Hollow cylindrical roller bearings 31 can be used, or in extreme cases no roller bearings 31 need be used. However, if no roller bearings are used, the tolerances between the components making up the system of 21 must be much closer and exacting than normal; but it is remembered that compensating for non-perfect manufacturing tolerances is one objective which the inventive configuration is meant to compensate. Each of the roller bearings 31 is preferably a solid cylindrical tube, although it is possible to use a series of spherical ball bearings if chosen based upon the correct size and number to fit within a holding space. A hollow cylindrical tube could provide for lighter weight, but one which is formed from sheet stock might not have a sufficient closure weld, and one formed from tubing might not be strong enough to hold.

The central bearing member 33 has a cylindrical portion 35 having an end 37 into which a key fit, or in this case, what is shown as a cross shaped cavity 39 is formed. The cross shaped cavity will interfit with and rotate a control bar 41, which enables the central bearing member to transmit rotational force to the control rod 41. Central bearing member 33 has a conical bearing surface 43 which directly impinges upon and rolls against the roller bearings 31. However, as will be seen, some amounts of the contact force with respect to the roller bearings 31 will occur along their end edges, and this in turn depends on the tolerance and size.

Opposite the end at which the cross shaped cavity 39 is located, the central bearing member 33 has a disc shaped chain sprocket portion 45, having a series of apertures 46. The apertures 46 accommodate the spheres of a chain or ball rope 47 and provide traction between the sprocket portion 45 and ball rope 47. The ball rope 47 shown passing over the sprocket portion 45 and which extends downward. The apertures 46 are optional and appear where the sprocket portion 45 is thin and such structures enable the ball rope 47 to gain traction. Typically the ball rope 47 will form a closed loop at the bottom of its lower extent so that the chain may be continuously operated to turn the central bearing member 33.

To the right of the central bearing member 33 is an inner housing 49. Inner housing 49 carries a pair of rope pulleys 51 in the event that the carriers used in the vertical blind are to be displaced by pull ropes. Another alternative is the use of a wand mounted to a pull carrier. Adjacent the rope pulleys 51 is a central frusto-conical bore 53, which is complementary to the conical bearing surface 43. Evenly spaced within the central frusto-conical bore is a series of rounded slots 55. The slots 55 are rounded such that width is wider than the roller bearings 31, but the depth is sufficiently shallow that the roller bearings always have contact with the conical bearing surface portion 43. As will be seen, the slots 55 are formed with a larger radius circle r2 such that the radial center point is displaced slightly more toward the entrance of the slot 55. Put another way, circle r2 is more shallowly formed into the surface of the central frusto-conical bore 53, than the diameter r1 of the roller bearing 31 to cause the roller bearing 31 to protrude into the central frusto conical bore to contact the conical bearing surface 43. At the top of the inner housing 49 is a pair of engagement bosses 57 which provide the material into which the screws 27 are engaged to hold the outer housing member 23 onto the inner housing 49. The inner housing 49 is so named since its exterior shape is made to fit within the end of the track 25.

The control bar 41 is oriented to fit through a series of carriers 61, 63 & 65. a lead carrier, and its connection to ropes which would be supported by the pulleys 51 are omitted for clarity. Each of the carriers 61, 63 & 65 are designed to spread apart to a defined spacing when the vertical blind system 21 is closed and the window or door covered, and to compress to a close spacing when the vertical blind system 21 is opened and the window or door is exposed. The carriers 61, 63 & 65 have a series of slidably displaceable spacer tabs 67 each having a head end portion 69 with a horizontally enlarged portion and a tail end portion 71 with a vertically extending portion 73, to enable carriers 61, 63 & 65 to become automatically spaced and collapsed, but with no interference of the spacer tabs 67. The head end portions 69 can fit through an upper "U" shaped space 75 in each succeeding one of the carriers 61, 63 & 65 enabling the head end portions 69 to "stack" within the "U" shaped space 75. Each of the carriers 61, 63 & 65 has a vertically downwardly extending vane support 77.

The control rod 41 extends through a series of worm gear sleeves 79 within each of the carriers 61, 63 & 65 to rotate the series of vertically downwardly extending vane supports 77 to cause vertical blind panels (not shown) to rotate between a closed, light blocking position and a light admitting open position. When the system 21 is assembled, actuation of the ball rope 47 will cause the control rod 41 to actuate the vertically downwardly extending vane supports 77.

Figure 2:
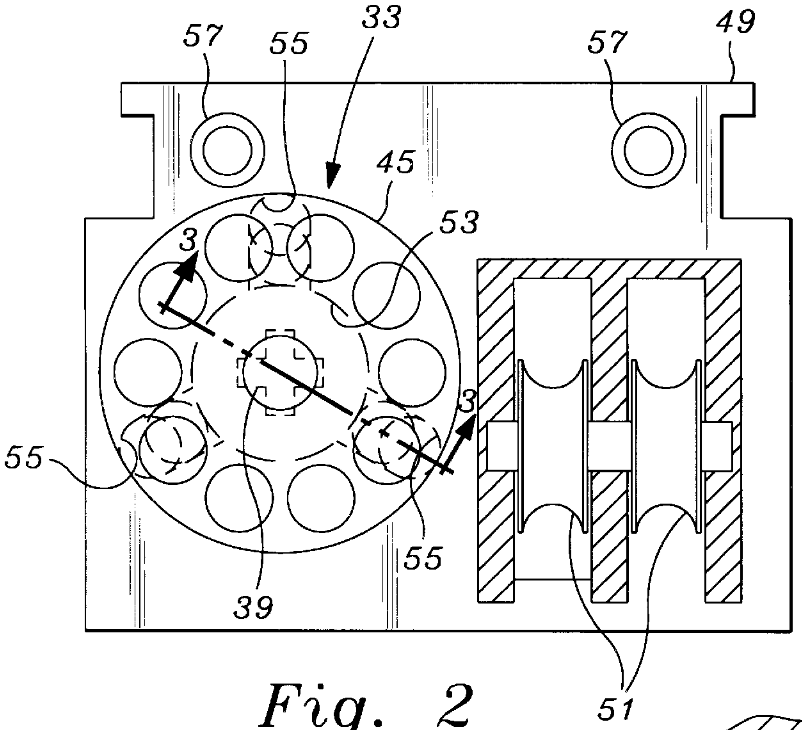
FIG. 2 is an end view of the housing shown in FIG. 1 and showing the angled nature of the bearings, which are shown in phantom, as well as cord pulleys for operating the carriers across a track.

Referring to FIG. 2, a view taken along line 2—2 of the assembled housing, including the outer housing member 23 and the inner housing member 49 illustrates the end of the chan sprocket portion 45 of the central bearing member 33. The central frusto-conical bore 53 and its series of rounded slots 55 are shown in what appears to be double phantom, but it must be remembered that the series of rounded slots 55 are angled with respect to the straight-on view of FIG. 2 and thus have a nearer, circumferentially greater located end and a farther away, circumferentially smaller located other end, with respect to the center of the central bearing member 33.

The rope pulleys 51 are shown in greater detail and may be press-fit within the inner housing 49. The end view of the bosses 57 show their thickness to accommodate the screws 27, and which may also be formed to interfit with the outer housing member 23.

Figure 3:
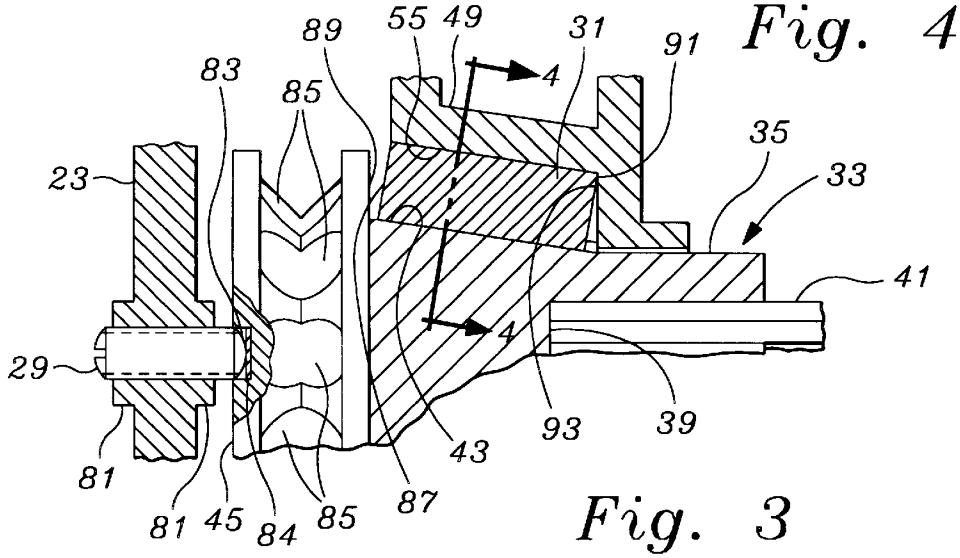
FIG. 3 is a sectional view taken along line 3—3 of FIG. 2 and illustrate the end edge contact of the roller bearings on the face end of the central bearing member and on the opposite edge of the roller bearing at the end of a groove in the cylindrical bore of the bearing housing.

Referring to FIG. 3, a section taken along line 3—3 if FIG. 2 and which also illustrates portions of the outer housing member 23 are shown, since it is shown in assembled form. In this view, set screw 29 is shown within a pair of bosses 81 formed in outer housing member 23. As an alternative, an optional sleeve could be used having a metal internal thread for reinforced support by the outer housing member 23 and to prevent stripping of the set screw 29 with respect to the outer housing 23. As can be seen, the inside tip of the set screw 29 contacts the disc shaped chain sprocket portion 45 at a shallow bore 83, and which contains a thin metal plate 84 to prevent a wearing away of the center of the disc shaped chain sprocket portion 45. With the shallow bore 83, the set screw can act both to urge the central bearing member 33 forward, and also impart some centering assistance. Downward lateral force on the central bearing member 33 will be resisted both by the central bearing member 33 being surrounded by the inner housing 49, and by support from the set screw 29 engagement with the shallow bore 83.

Also seen are a series of round depressions 85 in the disc shaped chain sprocket portion 45. Each of the depressions 85 accommodates one sphere shaped member of the ball rope 47. At the upper side of FIG. 3, the roller bearing 31 can be seen as a hollow cylinder. Here can be seen two important areas of engagement of the roller bearing 31. The end of the roller bearing 31 facing the disc shaped chain sprocket portion 45 has a circumferentially innermost (measured with respect to the axis of the central bearing member 33) edge 87 which may roll against a radial surface 89. a gap is shown between the edge 87 and the radial surface 89, as would be expected to be present, particularly if the tolerances in the materials were not as exact.

At the other end of the roller bearing 31, an edge 91 rolls against an inner corner surface 93 of the series of rounded slots 55. Where the clearance adjacent the edge 87 exists, the roller bearing 31 may axially displace itself within the slot 55 as it rotates.

In this configuration, the roller bearing 31 has a dual mode of turning. First, the roller bearing 31 turns between the rounded slot 55 of the inner housing 49 and the conical bearing surface 43 of the central bearing member 33. Second, the circumferentially innermost edge 87 of the end of the roller bearing 31 closest to the disc shaped chain sprocket portion 45 rolls against the radial surface 89, as the circumferentially outermost edge 91 of the other end of the roller bearing 31 farthest from the disc shaped chain sprocket portion 45 rolls against the corner surface 93 of the end of the rounded slot 55. The angle of the roller bearings 31 with respect to the axis of the central bearing member 33 may vary between 5 and 15 degrees, and preferably is at 10 degrees.

Figure 4:
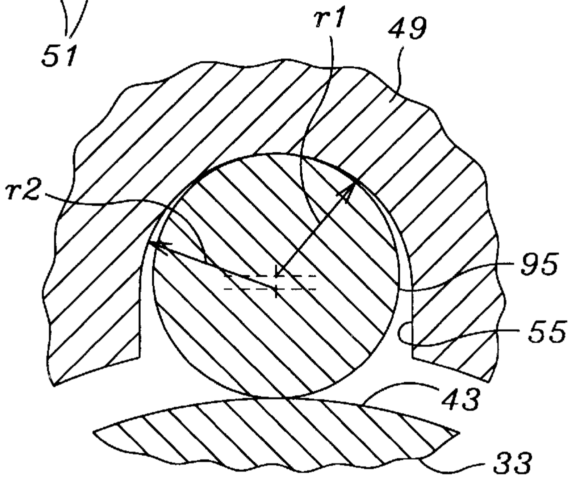
FIG. 4 is a section taken along line 4—4 of FIG. 3 and which illustrates the confines of the roller bearing grooves and the bearing contact with the conical surface of the main bearing, and also illustrates a hollow cylindrical version of the roller bearing.

Referring to FIG. 4, a view taken along line 4—4 of FIG. 3 illustrates the overall shape of the rounded slot 55. The dimensions of the slot are important, and some of the preferred dimensions follow. The roller bearing is preferably about 0.382 inches long. The outer radius is about $\frac{5}{32}$ (five–thirty seconds) of an inch in diameter.

The rounded slot has two radius measurements, which are essentially two superimposed radii. The radius r1 is $\frac{5}{64}$ of an inch and is taken from the center of a cylindrical roller bearing 95 to the middle surface of the slot 55. A second circle having a radius r2 of about $\frac{11}{128}$ of an inch the taken from a radial point displaced slightly out of the slot 55, to create a 0.017 inch gap between the inner housing 49 and central bearing member 33, and which may approximate the differences in the radial centers for the two radii.

The widest point of the central frusto-conical bore 53 is preferably about 0.45 inches in radius, while the narrowest point is about 0.225 inches in radius. The conical tilt is about 10° from the axis of the central bearing member 33. Other angles of tilt are permissible, but it is remembered that a greater angle of tilt will require more pressure from the set screw 29 to hold the central bearing member 33 in place.

Figure 5:
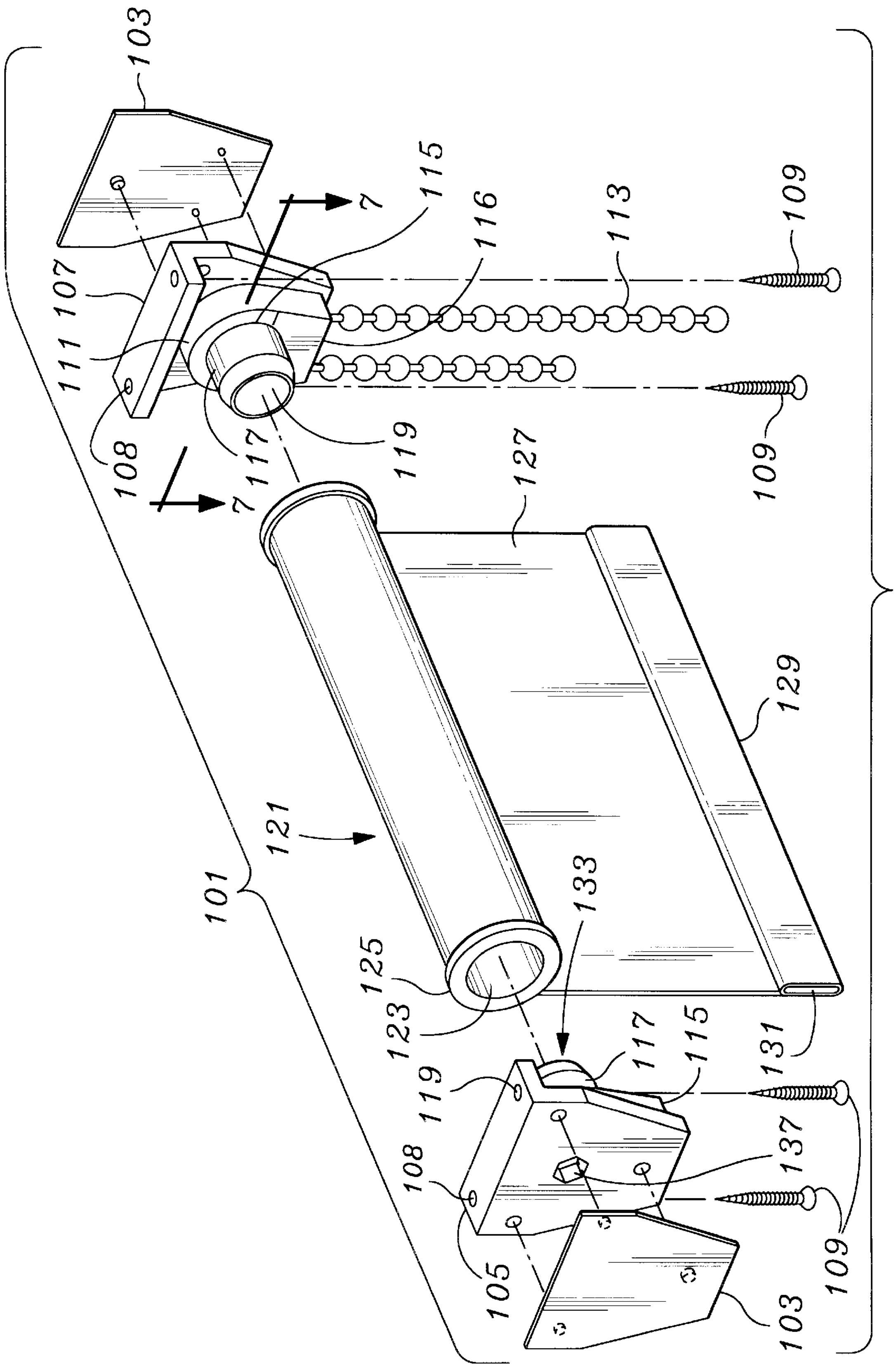
FIG. 5 is an exploded view of a roller shade configuration utilizing the roller bearings of the invention in a different configuration.

Referring to FIG. 5, a roller shade system 101 is illustrated. The roller shade system 101 utilizes many of the same principles as set forth for the vertical blind system 21, but utilizes a different structure. Beginning at the left, a cover plate 103 covers the end of a first bracket 105. The bracket 105 is angled and has the capability to be mounted against the mounting with screws or nails through both the bracket 105 and walls. At the other side of the drawing a bracket 107 is also seen. Brackets 105 and 107 have apertures 108 at its shallow end to accommodate a set of screws 109 for mounting on a wall in the other direction. Either or both of these mounting methods may be used.

Referring to the upper portion of the Figure for clarity, a roller shade control unit 111 is either attached to or formed integrally with a second bracket 107. The control unit 111 has a ball rope 113 which may be of the metal ball and link type, or may be of a rope and ball type. The control unit 111 has a plate shaped housing portion 115, including a cover plate portion 116, and a cylindrical insertion member 117 extending therefrom. The cylindrical insertion member 117 has a beveled tip portion 119 to facilitate its insertion into a roller shade tube assembly 121. The roller shade tube assembly 121 is in the shape of a hollow tube 123 and, in this case has a radially extending land 125 which can be helpful to help the shade material 127 roll onto the hollow tube 123 without binding or interfering with the ends. At the bottom of the shade material, a hem, or doubling over of the material 129 carries a stick 131 of wood or plastic to provide some greater weight at the bottom.

At the end of the roller shade tube assembly 121, a turning support 133 is located. A pure turning support 133 will have a matching plate shaped housing portion 115, and a cylindrical insertion member 117, and will merely provide rotational support for the other end of the roller shade tube assembly 121. However, with the present system, a second roller shade control unit 111 can be mounted on the first bracket 105 while the second bracket has an identical roller shade control unit 111, and will be shown in FIG. 6.

Since the roller shade control units 111 operate based upon friction, a window shade system 101 with two control units 111 can split the force necessary to operate the roller shade tube assembly 121. The use of two control units 111 are especially helpful where the window shade system 101 is used with an especially long roller shade tube assembly 121 and the user can operate it from either end. This is not possible with the two ended spring system discussed in the background section, since the two ended spring, which already has a heavy friction burden on actuation, has a lock out from any turning operation conducted from an opposite end of its roller shade tube assembly, such dual end operation is not possible.

Figure 6:
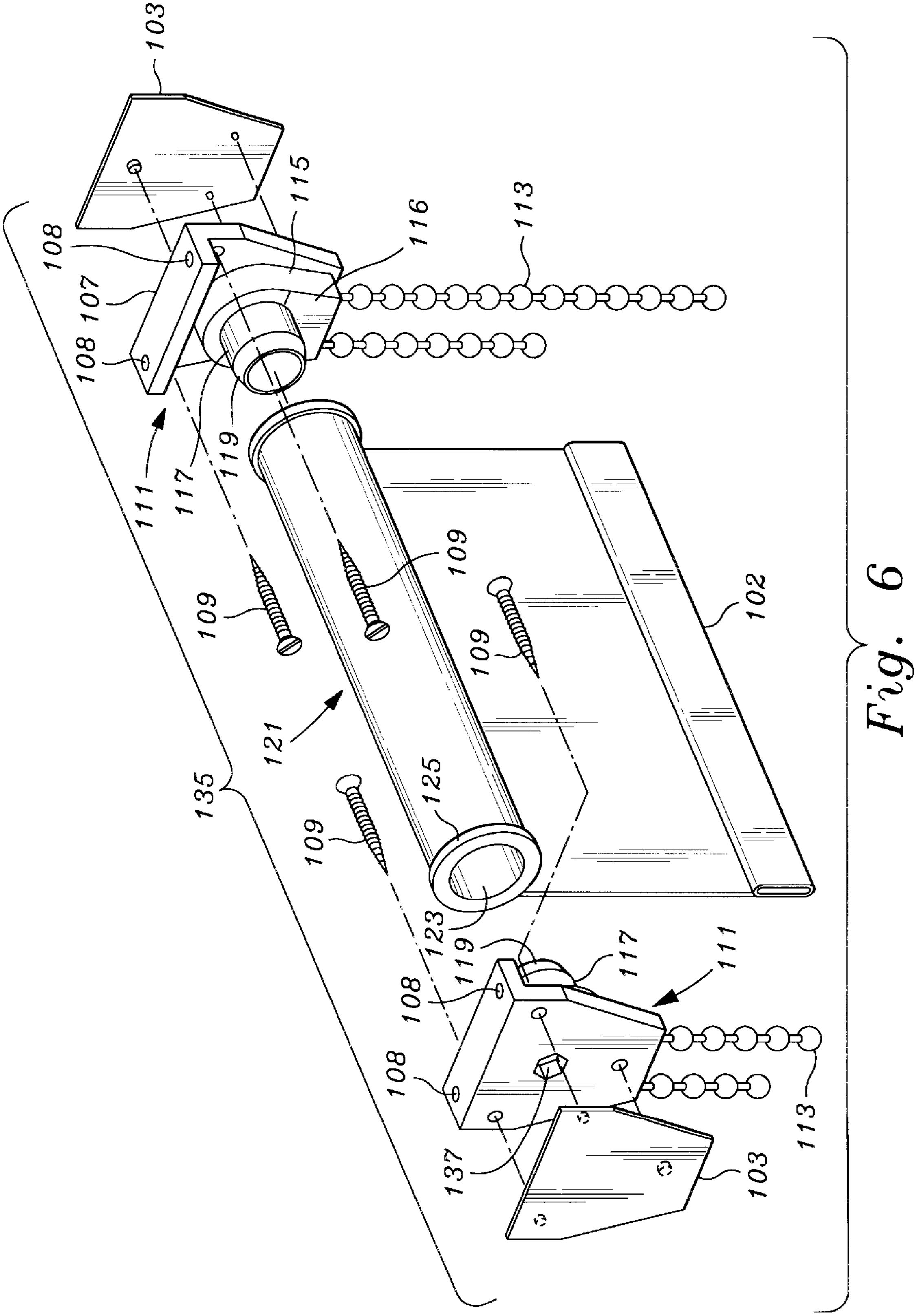
FIG. 6 is a configuration of the roller shade as shown in FIG. 5, but with two actuation and friction units, one at each end of the roller shade.

Referring to FIG. 6, a system 135 illustrates two brackets 107. Note a hexagonal recess 137 at the back of the bracket 107, which will be for accommodating and rotationally locking a bolt head, which is shown in FIG. 7.

Figure 7:
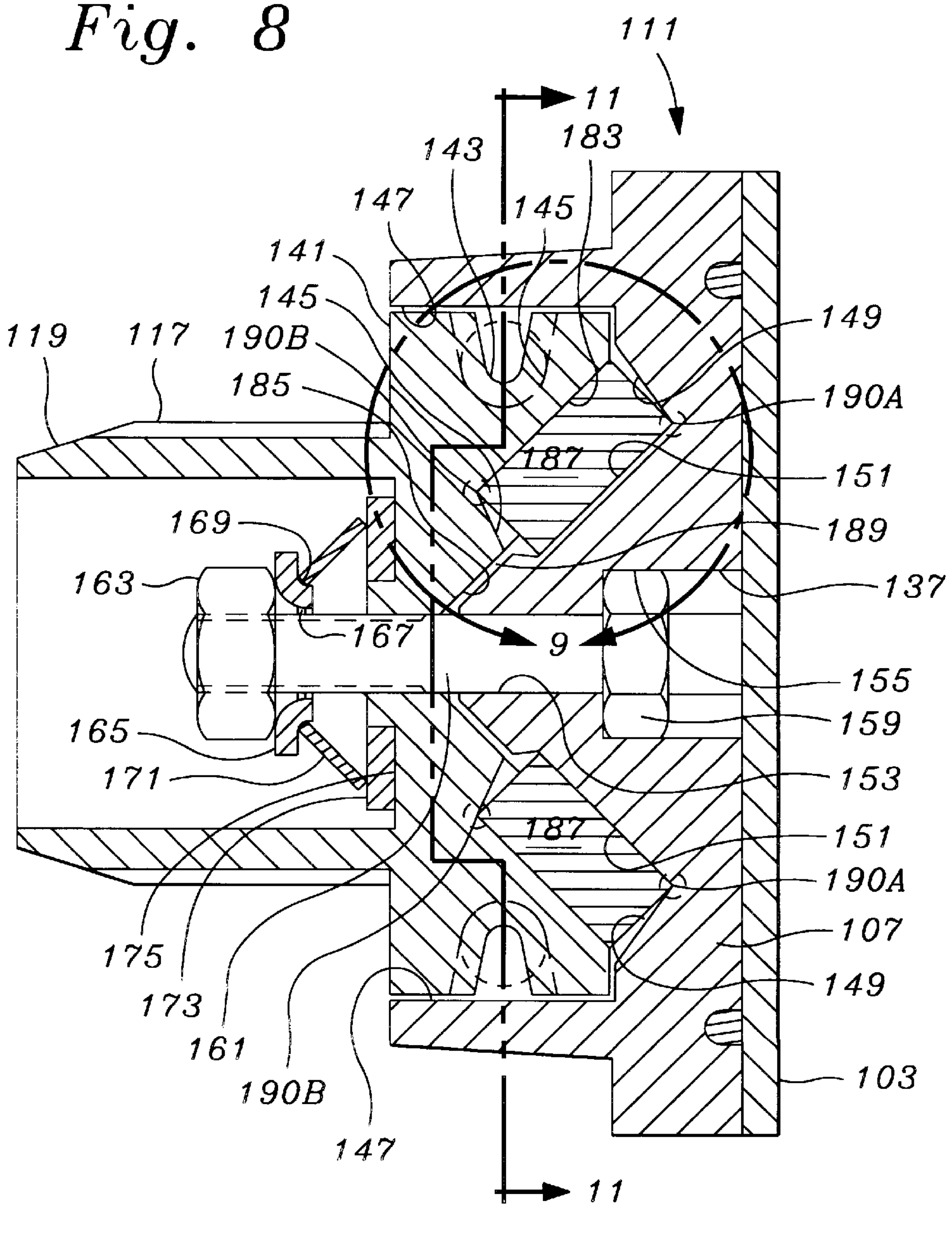
FIG. 7 is a sectional view taken along line 7—7 of FIG. 5 and illustrating the internal bearing areas.

Referring to FIG. 7, a section taken along line 7—7 of FIG. 5 illustrates the internals of a roller shade control unit 111 which is integral with the second bracket 107. As can be seen, the cylindrical insertion member 117 continues inside the control unit 111 and is integral with a sprocket portion 141. Sprocket portion 141 carries a slot 143 having a series of accommodation spaces 145 to interfit wit the balls of the ball rope 113 to enable the ball rope 113 to have positive traction with respect to the sprocket portion 141.

As can be seen, the outer curved portion of the control unit 111 is formed integrally with the second bracket 107. The internal features thereof include a circular outer bore 147, an angled roller bearing accommodation slot 149, a central conical bearing surface 151, and a central bore 153. At the side of the second bracket 106 facing the cover plate 103 is the hexagonal shaped bore recess 137 which extends throughout the length of such bore. The hexagonal shaped bore 137 is a straight bore, but it may have a hexagonal radial surface closest to the bore 153 and some other larger smooth or rounded surface leading back to the cover plate 103. Hexagonal shaped bore 137 can be of any shape which will captures a hexagonal head 159 of a bolt 161.

The other end of bolt 161 engages a nut 163 which engages threads on the bolt 161. Note that there is more than adequate clearance within the cylindrical insertion member 117 to reach the nut 164 with a socket wrench or a hex driver. The nut 163 and bolt 161 are used to compress the cylindrical insertion member 117 and its sprocket portion 145 against the second bracket 107.

The compression members which apply force from the nut 163 to the cylindrical insertion member 117 are carefully chosen. Nut 163 bears against a punched bore washer 165, which has the inner most portions of its material, nearest its aperture 167 through which the bolt 161 extends, turned downward to make an external groove 169 into which a smooth conical surface of a lock washer 171 interfits. The lock washer 171 is a toothed lock washer having an outer diameter of about 16 millimeters and an internal diameter of about 8.4 millimeters.

The teeth of the toothed lock washer 171 bear against an oversized flat washer 173, which in turn bears against a flat radial surface 175 of the inside of the cylindrical insertion member 117. In this configuration the turning of the cylindrical insertion member 117 is isolated from the ability to turn the nut 163. In order for the nut 163 to turn, the turning of the cylindrical insertion member 117 must transmit its turning force to the flat washer 173, and from the flat washer 173 to the lock washer 171 through its widely dispersed and low surface contact area teeth, and from the lock washer 171 through its conical upper neck to the smooth external groove 168 of the punched bore washer 165, and then from the punched bore washer 165 to it tangential contact about the lower rim of the nut 163 which is preferably a lock nut, having some polymeric engagement with the bolt 161 to further prevent its unintended movement. At each bearing junction just mentioned, much slippage is expected to occur. It is expected that the chain of slippage will be such that the turning force applied to the nut 163, when and if it occurs, will not be sufficient to move the nut 163.

The internal features of the cylindrical insertion member 117 include a brief conical spacing surface 181 which rides over and should ideally have no contact with the central conical bearing surface 151. Adjacent the conical spacing surface 181 is a slot 183 which has an upper angled end surface 185 to provide clearance for the roller bearing 187, which may be identical to or sized differently from the roller bearings 31 seen in FIGS. 1–4. The internal dimensions of the slot 183 will be the same as those previously discussed for FIG. 4, in that the roller bearing 31 is given a wider space for lateral movement, than the spacing it is given for its depth. Again, the size of the roller bearing 31 is such that it will always protrude from its slot 183 to extend across a gap 189 between the conical bearing surface 151 and the conical spacing surface 181, to engage the conical bearing surface 151 and be primarily structurally responsible for keeping the gap 189 during the turning process. Note that the accommodation slot 149 is angled away from the roller bearing 31 such that the inner edge of the roller bearing 31 contacts the apex of an angle formed between the accommodation slot and the central conical bearing surface 151 at a corner 190A. Likewise, at the other end of the roller bearing 31, the upper angled end surface 185 and the slot 183 form an angle, the apex of this angle is contacted by the outer edge of the roller bearing 31, at a corner 190B.

The roller bearings 187 are angled with respect to the axis of the bolt 161 and may vary between 35 degrees and 55 degrees with respect to the axis of the bolt 161 and is preferably at 45 degrees.

Figure 8:
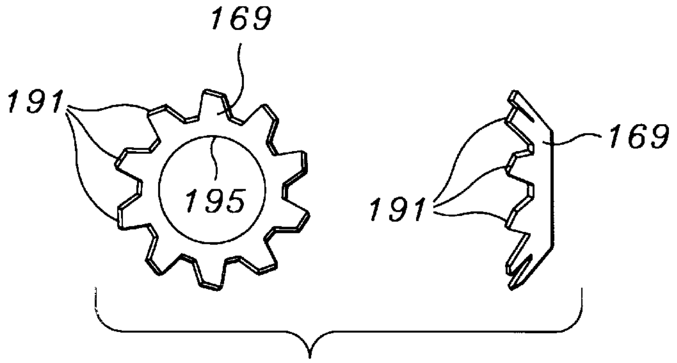
FIG. 8 is an expanded plan and side view of the lock washer seen in FIG. 7.

Referring to FIG. 8, an expanded plan and side view of the lock washer 169 is shown, including its teeth 191 and central aperture 195.

Figure 9:
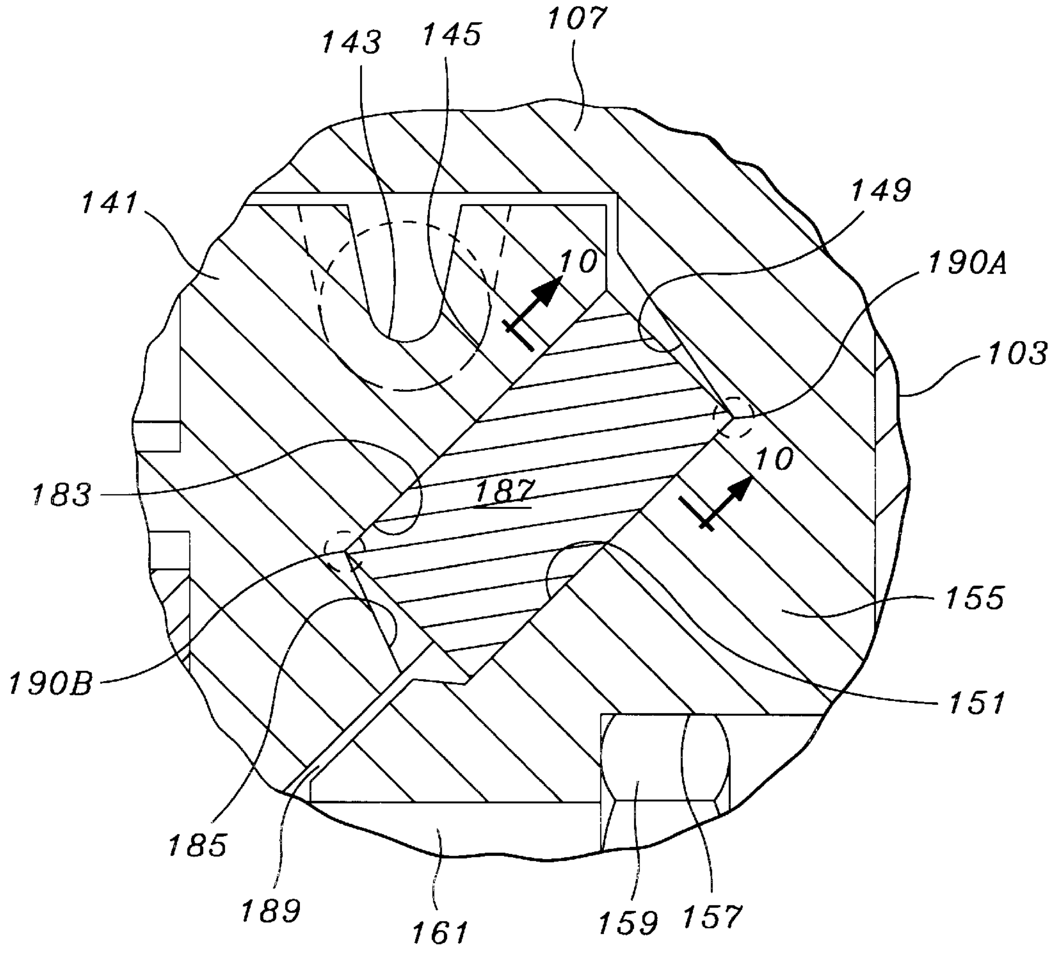
FIG. 9 is a closeup plan view looking into the space surrounding the roller bearing with an identification of its terminal radius, and side radius and blending from one to the other.

Referring to FIG. 9, a closeup view of the structures immediately surrounding the roller bearing 187 are illustrated. For clarity and understanding. As the sprocket portion 141 and cylindrical insertion member 117 turn together, the roller bearing 187 turns within its slot 183 as it rolls against the central conical bearing surface 151. The force of turning of the sprocket portion 141 and cylindrical insertion member 117 with respect to the bracket 106 will depend upon the axial tension exerted by the nut 163 and bolt 161. This tension can be pre-set when the bracket 106 is assembled. For custom installations, the tension can be re-set during installation to exactly match the needed tension for adequately supporting the roller shade tube assembly 121, typically in a position when the roller shade tube assembly has its shade material 127 maximally extended or near the expected maximal extension to be encountered for a given window or door. Also seen are the corners 190A and 190B which bear force from the rolling edges of the roller bearings 187.

Figure 10:
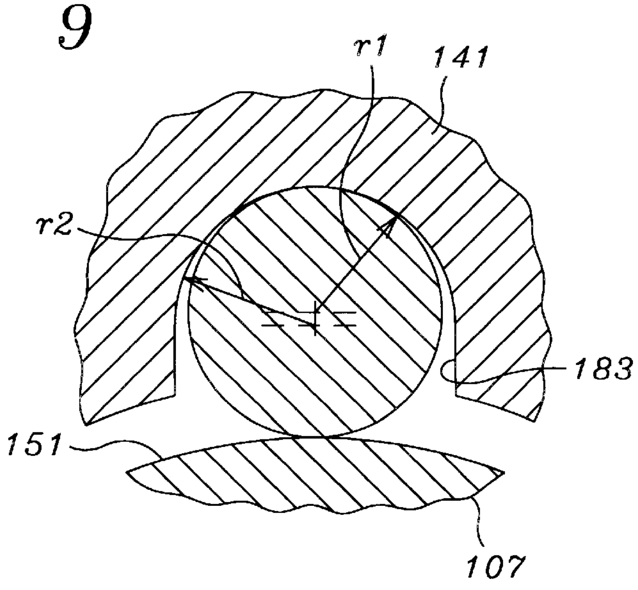
FIG. 10 is a closeup view, taken along line 10—10 and illustrating the details of the roller bearing and adjacent structures.

The roller bearings 187, slots 183 and conical bearing surface 151 are all parallel and inclined preferably about 45° from the axis of the bolt 161. The roller bearing 187 is preferably about 10.14 millimeters long and has an exterior diameter of about 4.0 millimeters. The slot 147 is again formed of two superimposed radii having different center points of sweep. FIG. 10 shows a radius r1 having a radius of about 2.0 millimeters. a radius r2 has its center point displaced slightly toward the central conical bearing surface 151, and has a radius r2 of about 2.25 millimeters. Again, the radius r1 and the radius r2 each have a sweep which is superimposed over each other and define the resulting shape of the slot 183.

Figure 11:
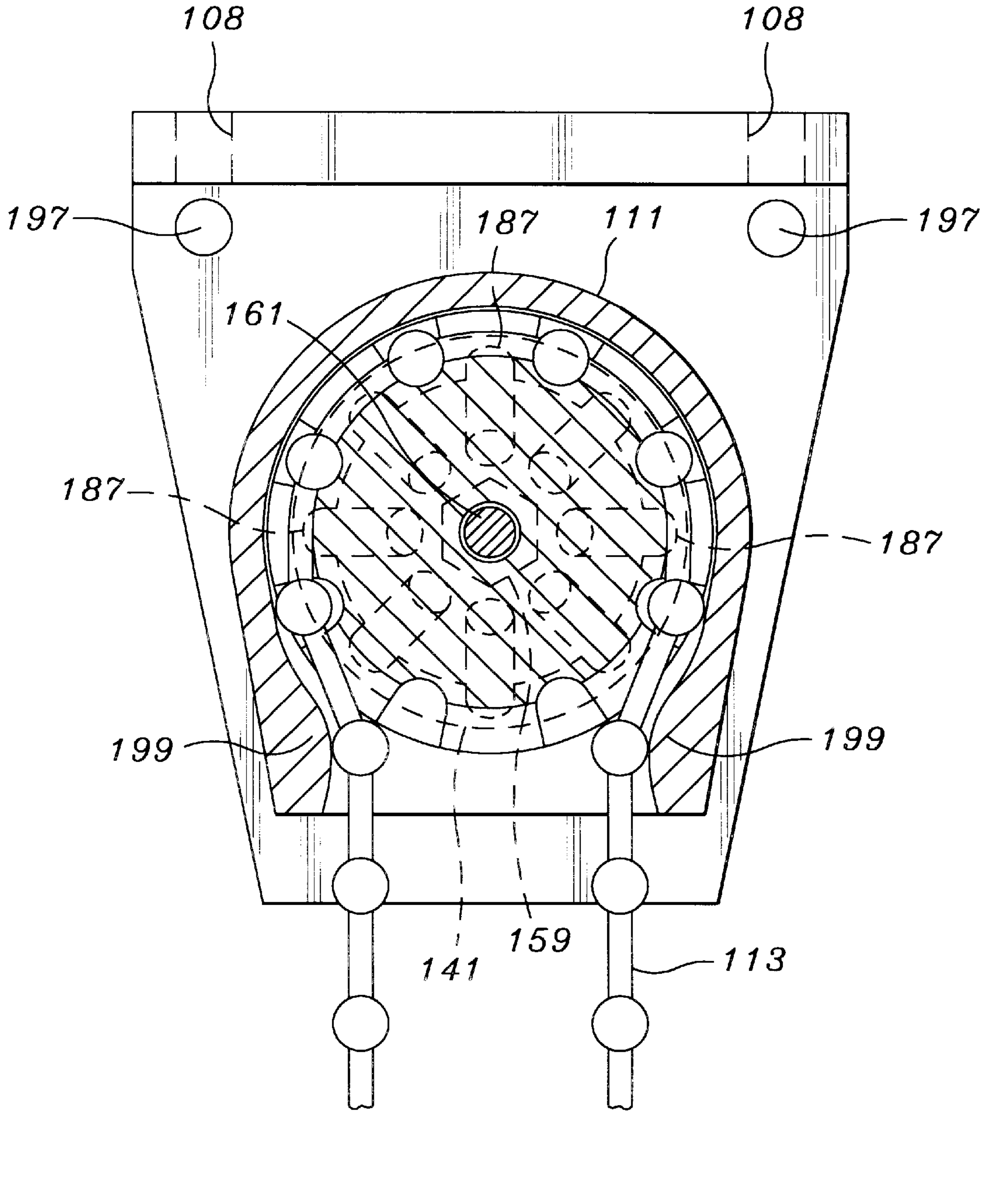
FIG. 11 is a sectional view taken along line 11—11 of FIG. 7, and illustrating the placement of the roller bearings at angular positions in between the balls of the chain for better distribution of force.

Referring to FIG. 11, an end view taken along line 9—9 of FIG. 7 illustrates the use of eight roller bearings 187. It is clear that 3, 4, 5, 6, 7, and 8 roller bearings can be used and the number will depend upon the degree of balance and smoothness desired. The orientation of FIG. 111 is such that the roller bearings 187 are positioned between the points of support for the spheres of the balls of a ball rope 113. Also shown is the bolt 161 hexagonal head 159, and in detail the series of accommodation spaces 145 which accommodate each of the balls of the chain 113. a pair of side mounting apertures or bores 197 are seen, in addition to the apertures 108. a pair of curved guides 199 can be used to urge the bottom portion of the ball rope 114 together to give greater traction and to help prevent slippage of the ball rope 113 in the slot 143.

Figure 12:
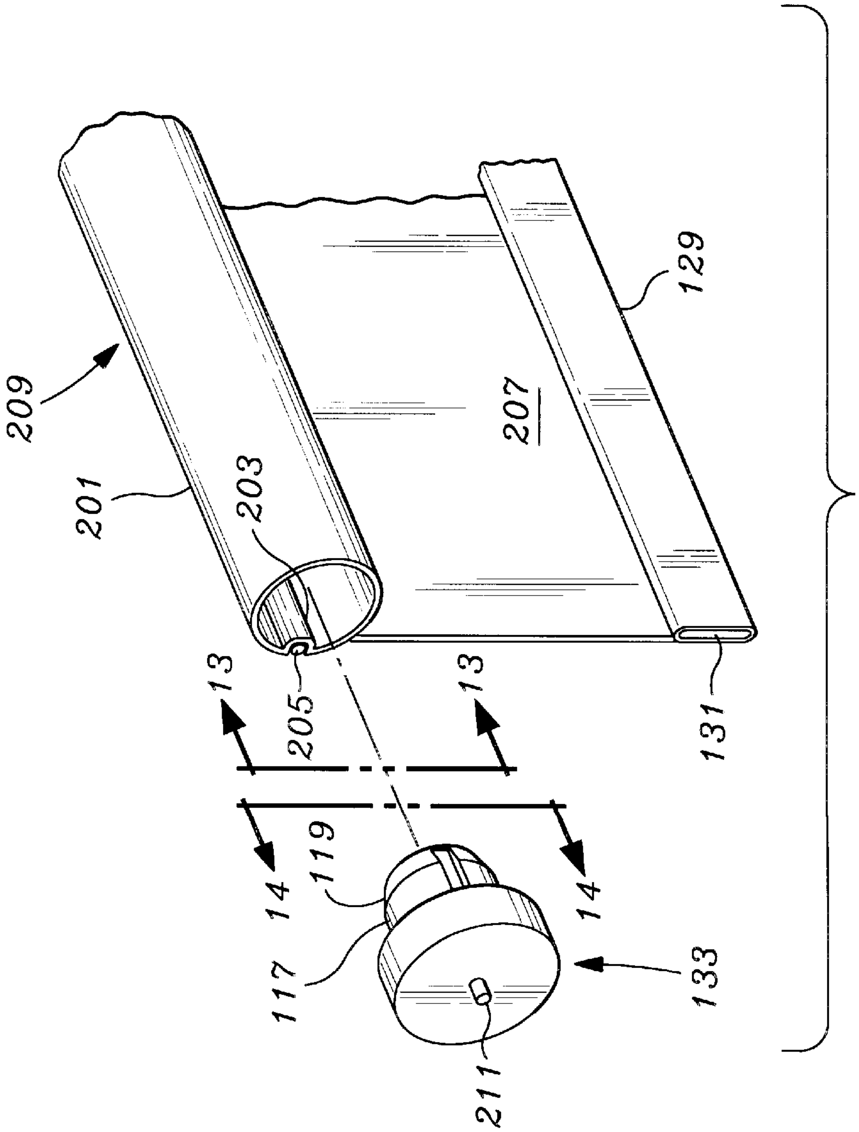
FIG. 12 is a closeup, exploded view of the non frictional fitting, and illustrating how it fits inside a window shade roller tube having an internal indent, or key, as well as the use of the indent as a key to hold the roller shade material.

Referring to FIG. 12, a metal tube 201 is used as an alternative to traditional roller shade tubes. The tube 201 has a slot 203 extending along the side of the tube. The slot 203 supports an elongate rod 205. The elongate rod holds a length of thin roller shade material 207 inside the slot 203. In the alternative, a series of shortened rods 205 can be used to hold the material 207 inside the slot 203 at various intervals along the tube 201. The material 207 forms a roller shade 209 and has many of the same structures as shown for roller shade 121. The turning support 133 is seen to have a short length axle 211 about which it is rotatably supported by the bracket 105 seen in FIG. 5.

Figure 13:
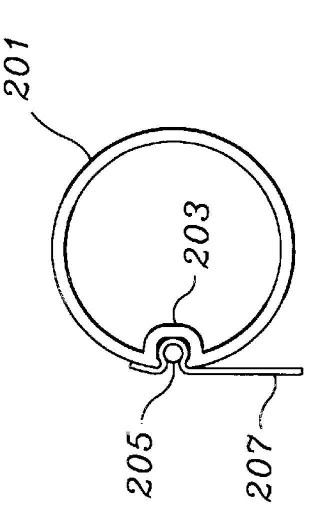
FIG. 13 is an end view, taken along line 11—11 and illustrating how the roller shade material fits within the slot and that it is held in by a pin or other structure within the slot.
Figure 14:
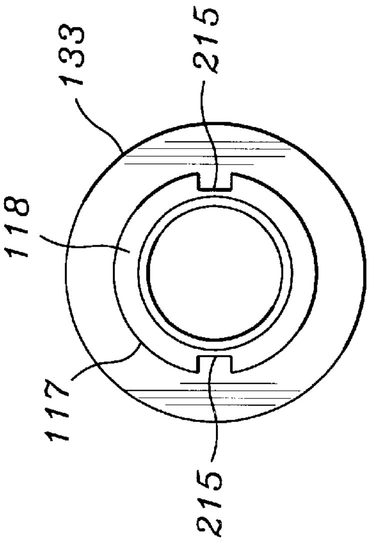
FIG. 14 illustrates an end view taken along line 14—14 of FIG. 12.

Referring to FIG. 13, an end view shows with greater detail the holding of the material 207 within the slot 203, and the position of the rod 205. Referring to FIG. 14, the turning support 133 can be seen to have a pair of side slots 215 which accommodate the internal extend of the slot 203 and not only permit cylindrical insertion member 117 to be inserted into the end of the tube 201, but rotationally lock the tube 201 with respect to the turning support 133. This feature is not as important for the free rotating end of the roller shade system 101 or 135, but this feature is used with the cylindrical insertion member 117 of control unit 111. One, two, three, four or more of the side slots 215 may be provided.

Figure 15:
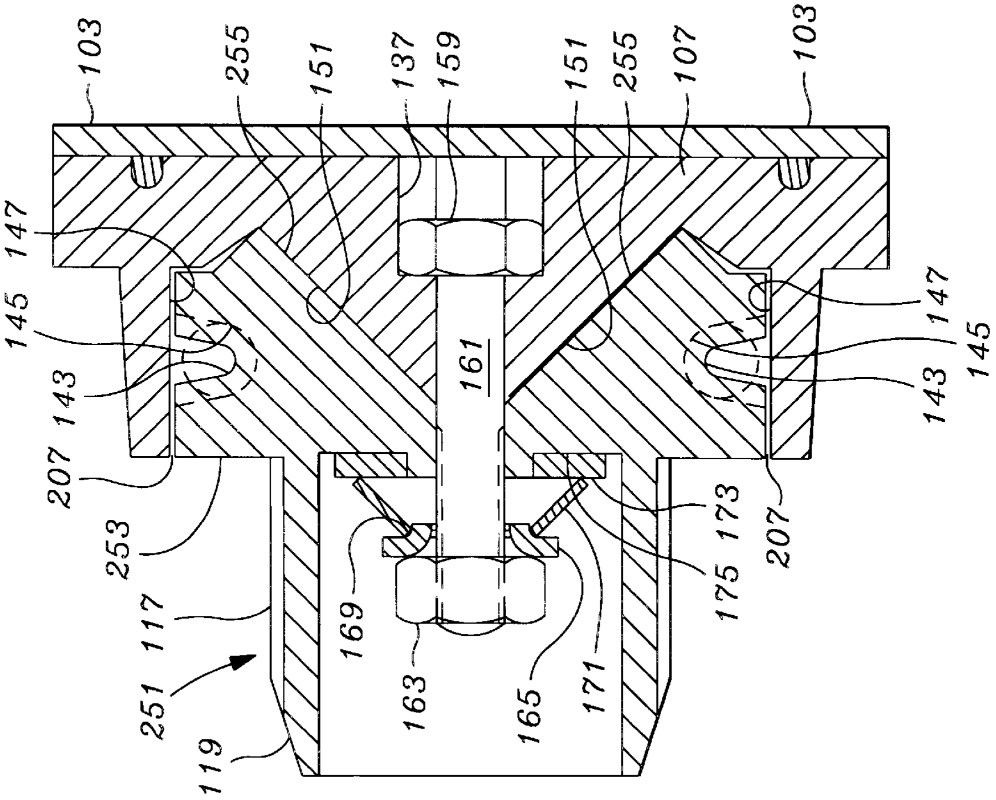
FIG. 15 illustrates a cross sectional view, similar to that seen in FIG. 7 where a pair of conical bearing surfaces carry no roller bearings.

As stated previously, the roller bearings 187 help control the friction in the control unit 111. Referring to FIG. 15, a control unit 251 is provided having the conical bearing surface as was seen in FIG. 7, but where a sprocket portion 253 carries an inwardly disposed conical surface 255 which is complementary to and opposes the central conical bearing surface 151. Note that a gap 257 may be provided in any configuration leading up to the mating faces of the surfaces 151 and 255. As such other surfaces may be formed to a lesser tolerance since a non-touching relationship is expected to occur, and may include circular outer bore 147. Except for the replacement of the slots 183, and the provision of the inwardly disposed conical surface 255, the structure and operation of the control unit 251 is the same as was the case for control unit 111.

Figure 16:
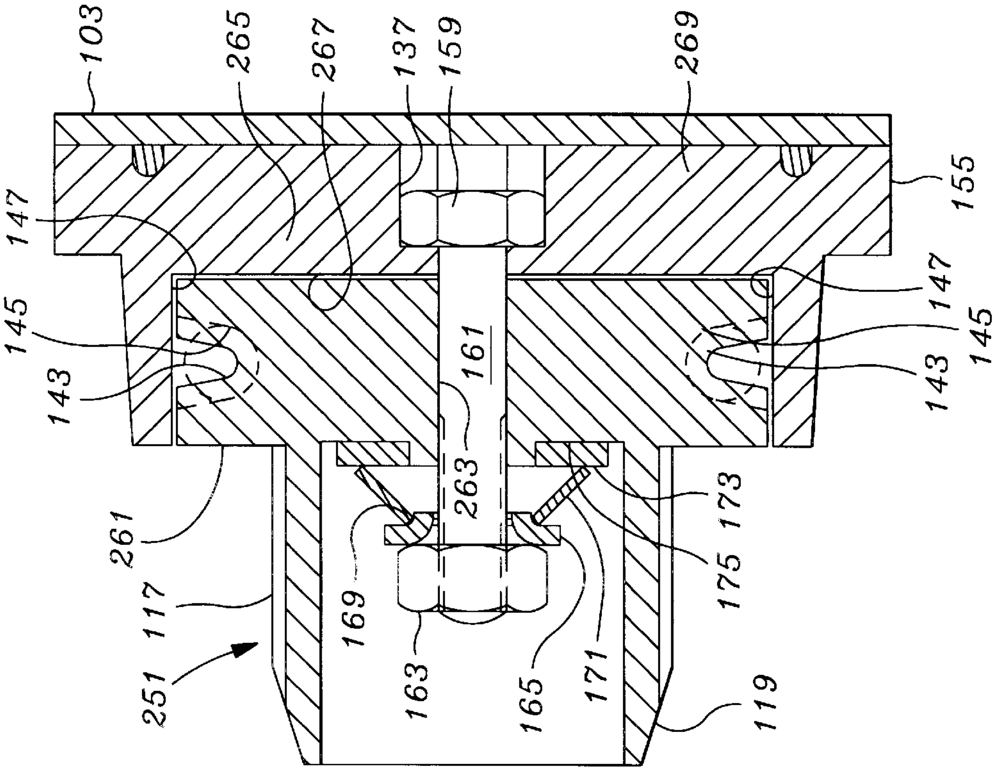
FIG. 16 illustrates a cross sectional view, similar to that seen in FIGS. 7 and 15 where a pair of cylindrical and radial bearing surfaces are used.

Referring to FIG. 16, a different embodiment, as a variation of the embodiment of FIG. 15 shows a bearing relationship of a sprocket portion 261 which uses a longer internal bore 263 with which to provide a longitudinal bearing surface against the bolt 161. Sprocket portion 261 has an expanded radial surface 265 which may operate against an expanded radial surface 267 located within the a differently shaped bracket 269. The operation of the control unit 251 is the same as was the case for control unit 111.

While the present invention has been described in terms of a bearing system which can be utilized in both vertical blind and roller shade configurations, one skilled in the art will realize that the structure and techniques of the present invention can be applied to many similar appliances. The present invention may be applied in any situation where controlled bearing support is desired, as well as bearing support having the capability to make up for differences in tolerance of component parts.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A bearing for use with a vertical blind system comprising:

a housing having a central frusto-conical bore;

a central bearing member having a first end having a keyed portion for engaging another member, and a second end opposite said first end having a slot having a series of accommodation spaces for engaging one of a ball rope or chain for turning said central bearing member, and having a frusto conical surface between said first end and said second end generally complementary to said frusto-conical bore of said housing.

2. The bearing for use with a vertical blind system as recited in claim 1 and further comprising a pair of rope pulleys rotationally supported by said housing.

3. The bearing for use with a vertical blind system as recited in claim 1 wherein said central frusto-conical bore has a series of evenly spaced rounded slots and further comprising a series of roller bearings, each roller bearing carried within an associated one of said slots and bearing on said frusto conical surface of said central bearing member.

4. The bearing for use with a vertical blind system as recited in claim 3 and wherein said series of evenly spaced rounded slots have a rounded slot radius larger than a roller bearing external radius, but wherein a depth of said rounded slot radius is sufficiently shallow that said roller bearing protrudes out of said rounded slot and a cylindrical exterior surface of said roller bearing fully contacts said frusto conical surface of said central bearing member.

5. The bearing for use with a vertical blind system as recited in claim 3 wherein said series of evenly spaced rounded slots are angled from about five to fifteen degrees with respect to an axis of said central bearing member.

6. The bearing for use with a vertical blind system as recited in claim 1 and further comprising an elongate track and wherein said housing fits partially within said elongate track.

7. The bearing for use with a vertical blind system as recited in claim 1 wherein said housing further comprises an outer housing member and an inner housing member and wherein said inner housing member contains said central frusto-conical bore, said outer housing member attachment to said inner housing member urging said central bearing member into said central frusto conical bore.

8. The bearing for use with a vertical blind system as recited in claim 7 wherein said outer housing member has an aperture in alignment with an axial center of said central bearing member, and further comprising a set screw displaceable into and out of said outer housing member to produce force against said central bearing member to adjustably urge said central bearing member into and against said central frusto conical bore to thereby accommodate for tolerance differences in said outer housing member, said inner housing member and said central bearing member.

9. The bearing for use with a vertical blind system as recited in claim 1 wherein said keyed portion for engaging another member is a cross shaped impression and further comprising:

an elongate track;

a plurality of carriers translatably supported by said elongate track, each one of said plurality of carriers having a downwardly extending pivotable vane support actuatable through a worm gear sleeve;

a cross shaped rod fittable within said cross shaped impression and extending through said worm gears of said plurality of carriers, said cross shaped rod actuatable by said central bearing member to pivot said vane supports.

* * * * *